US006851910B2

(12) United States Patent
Luffel

(10) Patent No.: US 6,851,910 B2
(45) Date of Patent: Feb. 8, 2005

(54) CARTRIDGE-HANDLING APPARATUS

(75) Inventor: Robert Wesley Luffel, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 157 days.

(21) Appl. No.: 10/202,731

(22) Filed: Jul. 24, 2002

(65) Prior Publication Data

US 2004/0018071 A1 Jan. 29, 2004

(51) Int. Cl.[7] .................................................. B66B 9/02
(52) U.S. Cl. ..................................... 414/283; 369/30.45
(58) Field of Search ................................. 414/281, 283; 369/30.43, 30.45, 30.57, 178.01, 30.4; 360/92, 98.06, 99.06

(56) References Cited

U.S. PATENT DOCUMENTS

| 4,910,619 | A | | 3/1990 | Suzuki et al. |
| 5,128,912 | A | | 7/1992 | Hug et al. |
| 5,293,284 | A | | 3/1994 | Sato et al. |
| 5,418,664 | A | | 5/1995 | Ostwald |
| 5,469,310 | A | | 11/1995 | Slocum et al. |
| 5,544,146 | A | | 8/1996 | Luffel et al. |
| 5,596,556 | A | | 1/1997 | Luffel et al. |
| 5,867,003 | A | | 2/1999 | Hashimoto et al. |
| 5,996,741 | A | | 12/1999 | Jones et al. |
| 6,016,291 | A | * | 1/2000 | Joos ........................ 369/30.43 |
| 6,160,786 | A | * | 12/2000 | Coffin et al. ............. 369/30.43 |
| 6,327,113 | B1 | * | 12/2001 | Mueller et al. ................ 360/92 |
| 6,381,089 | B1 | | 4/2002 | Helmick et al. |
| 6,441,991 | B2 | * | 8/2002 | Ostwald et al. ................ 360/92 |
| 6,445,672 | B1 | * | 9/2002 | Suzuki et al. .......... 369/178.01 |

OTHER PUBLICATIONS

Examiner R. Sozzi, European Serach Report, Application No. EP 03 25 3874, Nov. 11, 2003, 2 pages.

* cited by examiner

*Primary Examiner*—Christopher P. Ellis
*Assistant Examiner*—Mark A. Deuble

(57) ABSTRACT

Cartridge-handling apparatus for use in a media storage system. According to an embodiment of the invention, the cartridge-handling apparatus may comprise a platform mounted in the media storage system and movable along a displacement path defined therein. A carriage is mounted to the platform and rotatable about a line normal to the displacement path. In addition, a cartridge-engaging assembly is mounted to the carriage, and faces different directions when the carriage is so rotated. A lift system operatively associated with the cartridge-engaging assembly is provided for vertically positioning the cartridge-engaging assembly relative to the carriage.

20 Claims, 6 Drawing Sheets

CARTRIDGE-HANDLING APPARATUS

FIELD OF THE INVENTION

The invention generally pertains to media storage systems and, more specifically, to media storage systems and cartridge-handling apparatus therefor.

BACKGROUND OF THE INVENTION

Media storage systems, or autochangers, are commonly used to store data cartridges at known locations and to retrieve the desired data cartridges so that data may be written to and/or read from the data cartridges. Accordingly, large volumes of computer-readable data can be stored on numerous data cartridges and accessed by a single computer or by multiple computers connected to the media storage system over a network.

Such media storage systems may include one or more storage magazines and cartridge read/write devices. The storage magazines serve as a storage location for data cartridges, and the read/write device(s) provide access to data stored on the data cartridges. The media storage system may also include a cartridge-engaging assembly, or "picker", as well as a drive system for moving the cartridge-engaging assembly among and accessing data cartridges stored in the media storage system. For example, if a certain data cartridge is to be read, a control system operatively associated with the drive system causes the drive system to move the cartridge-engaging assembly to the location of the desired data cartridge. Then, the cartridge-engaging assembly retrieves the data cartridge and delivers it to the cartridge read/write device. The drive system and cartridge-engaging assembly may also be used to return the data cartridge to the storage magazine following the read/write operation.

The storage magazines and read/write device(s) are commonly positioned within the media storage system in a generally U-shaped arrangement. That is, the storage magazines are positioned opposite to and facing one another (i.e., each defining one "leg" of the U-shaped arrangement), and the read/write device(s) are positioned at one end of the media storage system in orthogonal relation to each of the storage magazines. However, the cartridge-engaging assembly commonly used with such media storage magazines is restricted to linear movement in a single plane of the media storage system. The restricted movement of the cartridge-engaging assembly requires that it be moved along a generally U-shaped path in the media storage system to access each of the storage magazines and the read/write device(s).

Accordingly, media storage systems for use with such cartridge-engaging assemblies must be sized to accommodate the U-shaped path of the cartridge-engaging assembly. However, moving the cartridge-engaging assembly about the U-shaped path is time-consuming. For example, the cartridge-engaging assembly may be parked on one leg of the U-shaped path in the media storage system when it receives a signal to retrieve a data cartridge that is stored along the other leg of the U-shaped path. The cartridge-engaging assembly must then be moved along the U-shaped path past the read/write device to retrieve the desired data cartridge, and then moved back along the U-shaped path to deliver the data cartridge to the read/write device. In addition, the restricted movement of the cartridge-engaging assembly affects the storage density of the media storage system (i.e., limits the number of data cartridges that can be stored in a defined space).

SUMMARY OF THE INVENTION

An embodiment of the media storage system of the present invention may comprise first and second storage magazines arranged facing opposite one another and having at least upper and lower storage chambers formed therein. A guide system defines a displacement path between the first and second storage magazines. A cartridge-engaging assembly mounted to the guide system is movable on the guide system along the displacement path between the first and second storage magazines. In addition, the cartridge-engaging assembly is rotatable about a line normal to the displacement path to face either the first or the second storage magazine. A lift system operatively associated with the cartridge-engaging assembly may be provided to position the cartridge-engaging assembly adjacent the upper and lower storage chambers formed in the first and second storage magazines.

An embodiment of a cartridge-handling apparatus of the present invention may comprise a platform mounted in a media storage system and movable along a displacement path defined therein. A carriage is mounted to the platform and rotatable about a line normal to the displacement path, and a cartridge-engaging assembly is mounted to the carriage and faces different directions when the carriage is so rotated. A lift system operatively associated with the cartridge-engaging assembly is provided for vertically positioning the cartridge-engaging assembly relative to the carriage.

BRIEF DESCRIPTION OF THE DRAWINGS

Illustrative and presently preferred embodiments of the invention are illustrated in the drawings, in which.

DETAILED DESCRIPTION

Figure 1:
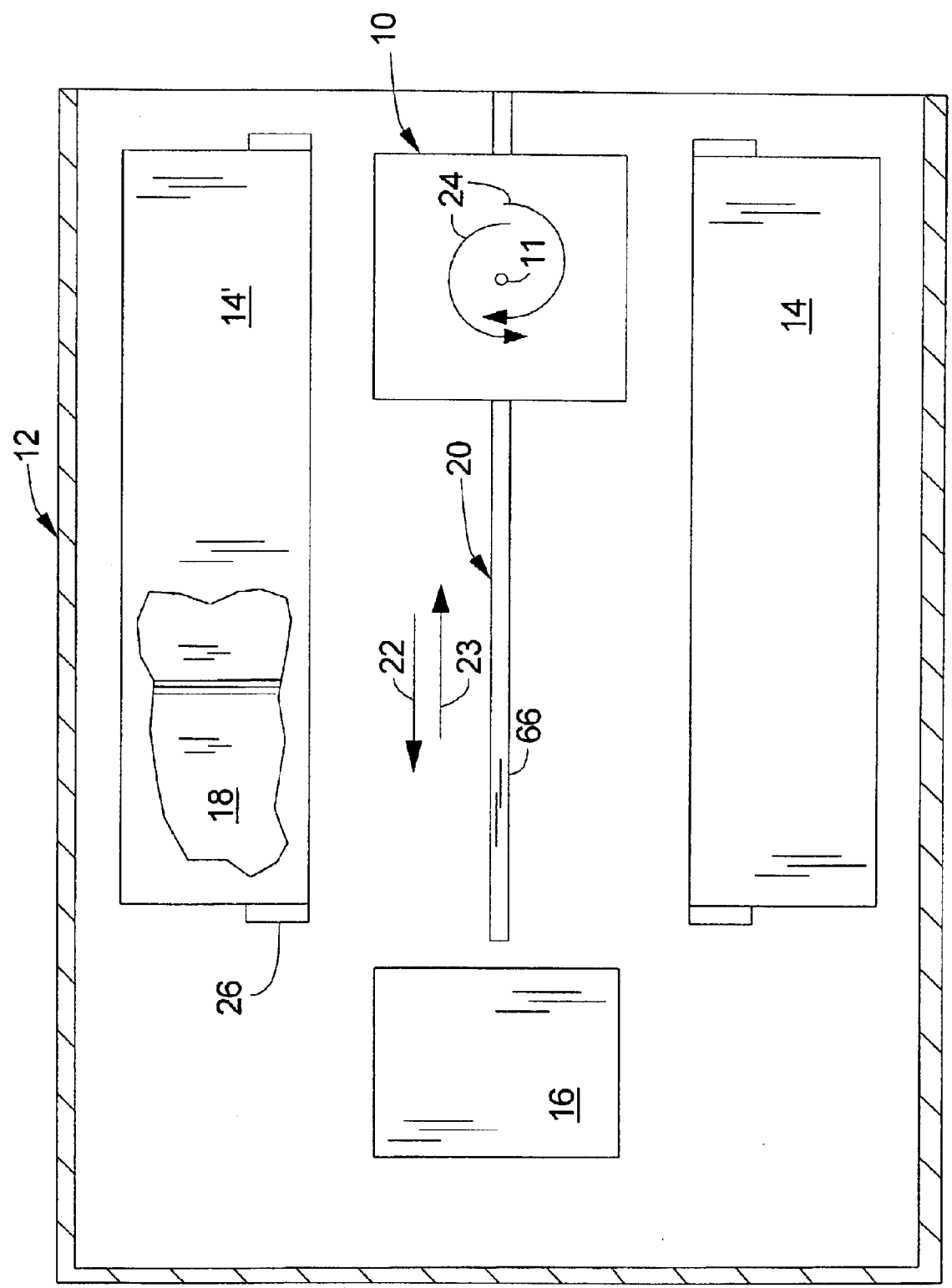
FIG. 1 is a plan view of a media storage system as it may be used according to one embodiment of the invention to store and access data cartridges therein.

Cartridge-handling apparatus 10 as it may be used in a media storage system 12 is shown and described herein according to embodiments of the invention. One embodiment of a media storage system 12 is shown in FIG. 1 as it may be used according to the teachings of the invention. According to such an embodiment, one or more storage magazines 14, 14' for storing a number of data cartridges 18 may be suitably arranged in the media storage system 12 (e.g., parallel to and facing one another). In addition, one or more read/write devices 16 may also be provided for read and/or write operations and suitably arranged in the media storage system 12. In the embodiment shown in FIG. 1, a read/write device 16 is shown oriented in orthogonal relation to storage magazines 14, 14'. It is understood, however, that other suitable arrangements of storage magazine(s) 14, 14' and/or read/write device(s) 16 in the media storage system 12 are also contemplated as being within the scope of the invention. For example, storage magazine(s) 14, 14' and/or read/write device(s) 16 may be arranged in a circle or other multi-sided configuration (e.g., a square), or along a linear or curvilinear path (e.g., S-shaped, L-shaped, etc.).

It should be understood that the number and arrangement of storage magazine(s) 14, 14' and read/write device(s) 16 for a particular media storage system 12 may depend upon various design considerations. By way of example, such considerations may include the frequency with which data is accessed by one or more users of the media storage system 12. That is, fewer storage magazines 14, 14' and/or more read/write devices 16 may be provided when users require frequent access to the data. Likewise, more storage magazines 14, 14' and/or fewer read/write devices 16 may be provided when users require less frequent access to the data. Other considerations may include the desired dimensions of the media storage system. In such embodiments, read/write device(s) 16 may be arranged in parallel relation to storage magazines 14, 14' (i.e., parallel to the guide system 20) and/or storage magazines 14, 14' may be arranged orthogonal to one another.

In addition, it is noted that the media storage system 12 is not limited to use with any particular read/write device(s) 16 or storage magazines 14, 14'. While the read/write device 16 may be a multi-capacity drive (i.e., configured to receive two or more data cartridges 18 therein), in other embodiments, read/write device 16 may be a single-capacity drive. Similarly, storage magazines 14, 14' may have any suitable number of storage chambers or slots formed therein for receiving data cartridges 18.

Figure 2:
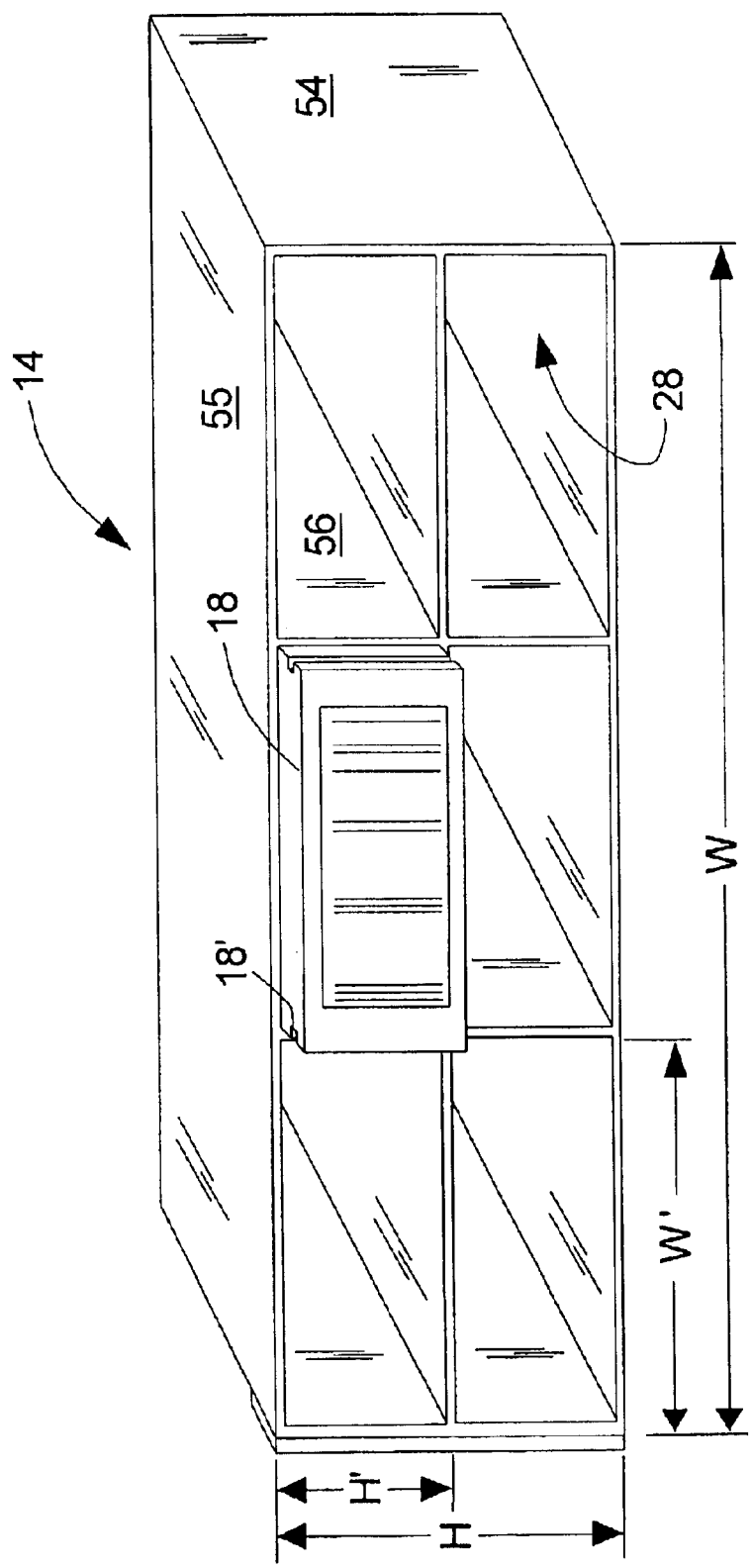
FIG. 2 is a perspective view of one embodiment of a storage magazine for use in a media storage system such as that shown in FIG. 1.

One of the storage magazines 14 that may be used with media storage system 12 according to the teachings of the invention is shown in more detail in FIG. 2. The media storage magazine 14 comprises a number of walls (e.g., sidewall 54, lid 55, partition 56, etc.) which define a number of upper and lower storage chambers or slots 28 for receiving data cartridges 18 therein. For example, a data cartridge 18 is shown in FIG. 2 stored in one of the upper storage chambers 28 defined in storage magazine 14.

According to one embodiment of the invention, storage magazines 14, 14' are sized so that the media storage system 12 conforms to Electronics Industry Association (EIA) standards. One EIA unit (or "U") is currently defined as having a height of 44.5 millimeters (mm) or 1.75 inches (in). Electronic equipment height is often specified in EIA units. For example, equipment having a height of 44.5 mm may be referred to as one EIA unit, or "1U". Likewise, equipment having a height of 89 mm may be referred to as two EIA units or "2U", and so forth. EIA also specifies that equipment conforming to EIA standards be no wider than 450 mm (17.72 in). In addition, EIA also defines uniform, aligned hole spacing for mounting the equipment to the rack systems. Equipment that is sized according to EIA standards may be readily mounted to standard EIA cabinets or rack systems (e.g., rack 26 in FIG. 2).

Accordingly, an embodiment of the media storage system 12 that conforms to EIA standards may have an overall height of 89 mm (i.e., "2U"), and an overall width 450 mm. Therefore, storage magazines 14, 14' are preferably sized smaller so as to fit within the media storage system 12. More specifically, storage magazines 14, 14' may be sized based on a number of design considerations, such as, but not limited to the internal overhead of the media storage system 12, and the number of data cartridges that are desired to be stored within the media storage system 12. For example, a media storage system 12 that is sized as a "2U" system, a maximum of three DLT data cartridges could be horizontally stacked in the storage magazine 14. However, practical limitations, such as manufacturing tolerances, space taken up by the panels (e.g., 55) defining storage chambers 28 in the storage magazine 14, etc., may limit the capacity of storage magazine 14 to two DLT data cartridges horizontally stacked therein.

Each storage magazine 14 sized for use with a "2U" EIA standard media storage system 12 may, for example, provide the capacity for storing six, standard data cartridges 18, arranged in three stacks of two data cartridges each, according to the embodiment shown in FIG. 2. Preferably, data cartridges 18 comprise either digital linear tape (DLT) or linear tape open (LTO) data cartridges. LTO data cartridges are approximately three millimeters narrower than DLT data cartridges, and may be accommodated in storage chamber 28 by adjusting the partitions and/or walls, inserting "fins" in storage chambers 28, etc. In any event, each storage chamber 28 is preferably sized (e.g., height H' and width W') to retain a single, standard data cartridge 18 therein, and the overall height H and overall width W of the storage magazine 14 allows it to be used in a "2U" EIA standard media storage system 12.

Although in the above example the media storage system 12 is a "2U" system, it is understood that the invention is not limited to use with "2U" media storage systems 12. In other embodiments, the media storage system 12 may be larger, while still conforming to EIA standards (e.g., "3U"). In yet other embodiments, the media storage system 12 need not conform to EIA standards.

While embodiments of the storage magazine 14 are shown and described herein as it could be used with LTO and/or DLT data cartridges 18 having a standard size and configuration, the invention is not limited to any particular type or size of data cartridge. Indeed, the storage magazines 14, 14' disclosed herein could be used with any of a variety of different sizes and/or types of storage medium (e.g., magnetic disk or tape, optical disk, etc.).

Referring again to FIG. 1, media storage system 12 may also be provided with a cartridge-handling apparatus 10 adapted to engage data cartridges 18 and transport them between storage magazines 14, 14' and read/write device 16. In one embodiment, cartridge-handling apparatus 10 may also be used to deliver data cartridges 18 to and from one or more mail slots (not shown), when so provided for use with the media storage system 12.

According to the teachings of the invention, embodiments of cartridge-handling apparatus 10 may be translated in three dimensions within the media storage system 12, as described in more detail below. Briefly, however, the cartridge-handling apparatus 10 may be moved in the direction of arrows 22 and 23 within the media storage system 12 along a guide system 20 to access and transport data cartridges 18 between storage magazines 14, 14' and read/write device 16. The cartridge-handling apparatus 10 may also be rotated about axis 11 in the directions of arrow 24 to face either of storage magazines 14, 14'. As such, cartridge-handling apparatus 10 may quickly and readily access data cartridges 18 in either of the storage magazines 14, 14'. In addition, cartridge-handling apparatus 10 may also be vertically positioned to access data cartridges 18 in more than one plane of the media storage system 12, such as those stored on top of one another as shown in the storage magazine 14 in FIG. 2.

The foregoing description of the media storage system 12 is provided in order to better understand one environment in which the cartridge-handling apparatus 10 of the present invention may be used. However, it should be understood that cartridge-handling apparatus 10 may also be used in conjunction with any of a wide range of other types and configurations of media storage systems, now known or that may be developed in the future.

Figure 3:
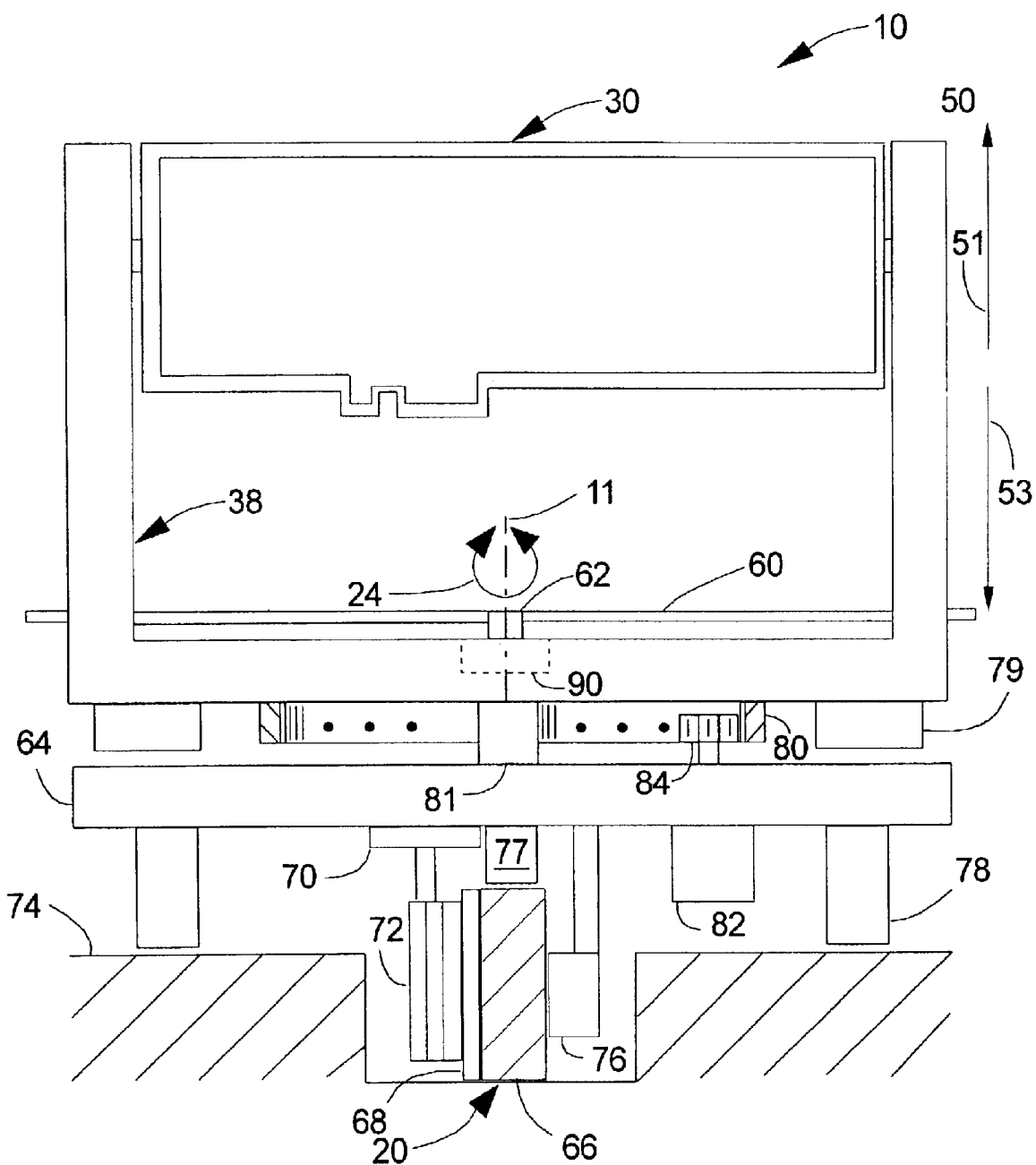
FIG. 3 is a side view of one embodiment of a cartridge-handling apparatus for use in a media storage system such as that shown in FIG. 1.

Cartridge-handling apparatus 10 will now be discussed in more detail with reference to the embodiment shown in FIG. 3 and FIG. 4. According to such an embodiment, cartridge-handling apparatus 10 may comprise a cartridge-engaging assembly 30 mounted in a carriage 38, which in turn is mounted to a platform 64, as shown in FIG. 3. Also according to this embodiment, cartridge-handling apparatus 10 may be mounted in the media storage system 12 to guide system 20.

Optionally, cartridge-handling apparatus 10 may be provided with one or more load-bearing members 78 to support platform 64 above "floor" 74 of the media storage system 12. For example, load-bearing members 78 may be mounted between platform 64 and floor 64 of the media storage system 12. Likewise, one or more load-bearing members 79 may be provided to support carriage 38 on platform 64. For example, load-bearing members 79 may be mounted between the carriage 38 and platform 64.

Of course, load-bearing member(s) 78, 79 may comprise any suitable contact surface and preferably roll or slide relative to the adjacent surface. For example, load-bearing member(s) 78 may comprise one or more rollers or bearings for rolling on the floor 74 of the media storage system 12. Or for example, load-bearing member(s) 79 may be made of a low-friction material (e.g., Teflon®) for sliding on platform 64. However, the invention is not limited to these examples.

The cartridge-handling apparatus 10 may be mounted in the media storage system 12 to guide system 20 as follows. The cartridge-handling apparatus 10 may comprise a gear assembly 72 operatively associated with a drive motor 70 that is mounted to platform 64, as shown in FIG. 3. Gear assembly 72 engages a gear rack 68 that is mounted to a guide track 66 of guide system 20. Guide track 66 preferably defines a displacement path for the cartridge-handling apparatus 10 to follow in the media storage system 12 (e.g., in the directions of arrows 22 and 23 in FIG. 1). Accordingly, drive motor 70 may be operated to rotate gear assembly 72 and move it along the gear rack 68, thereby moving the cartridge-handling apparatus 10 along the displacement path defined by guide track 66 in the media storage system 12.

One or more guide members 76, 77 may also be provided to support and/or guide cartridge-handling apparatus 10 along guide track 66. Guide members 76, 77 may comprise any suitable contact surface and are adapted to slide against guide track 66. For example, guide members 76, 77 may comprise one or more rollers or bearing(s) for contacting guide track 66. As another example, guide members 76, 77 may be made of a low-friction material (e.g., Teflon®) to slide on guide track 66.

It is understood that other embodiments for mounting cartridge-handling apparatus 10 in the media storage system 12 for translation therein are also contemplated as being within the scope of the invention. For example, other suitable guide systems are readily available and it would be well understood by one skilled in the art, after having become familiar with the teachings of the invention, to provide one or more such guide systems for mounting cartridge-handling apparatus 10 thereto. As an illustration, cartridge-handling apparatus 10 may be mounted in the media storage system 12 on a rail (e.g., a pole, an "I-beam", etc.) and driven by a pulley system. One pulley wheel may be mounted in the media-storage system 12 and another pulley wheel mounted to cartridge-handling apparatus 10, and the two pulley wheels operatively associated with one another via a chain or belt that can be used to drive cartridge-handling apparatus 10 along the displacement path. Another embodiment that may be used according to the teachings of the present invention is described in more detail in co-owned U.S. Pat. No. 6,327,113 B1 (Dec. 4, 2001) for the ROTATABLE CARTRIGE-ENGAGING ASSEMBLY of Mueller, et al. Yet other embodiments are also contemplated as being within the scope of the invention.

Cartridge-handling apparatus 10 may also comprise a carriage 38 pivotally mounted to platform 64 for rotation about axis 11 (e.g., about a line normal to the displacement path in the direction of arrows 24 of FIG. 1). One embodiment for mounting the carriage 38 to the platform 64 is shown in FIG. 3. According to this embodiment, carriage 38 is mounted to platform 64 at pivot 81 (e.g., using a pin, bearing, bolt, etc.). A drive motor 82 may be provided for rotating carriage 38 about pivot 81. More specifically, drive motor 82 may be mounted to platform 64 and operatively associated with a gear assembly 84 that engages a gear ring 80 mounted to the underside of carriage 38. Accordingly, drive motor 82 may be operated to rotate gear assembly 84 and move gear ring 80 relative thereto to rotate carriage 38 about axis 11.

Other embodiments for mounting carriage 38 to platform 64 are also contemplated as being within the scope of the invention, and the present invention is not to be limited to any particular embodiment thereof. As an example, another suitable embodiment that may be used according to the teachings of the present invention may include that which is described in more detail in co-owned U.S. Pat. No. 6,327,113 B1 (Dec. 4, 2001) for the ROTATABLE CARTRIGE-ENGAGING ASSEMBLY of Mueller, et al.

Figure 4:
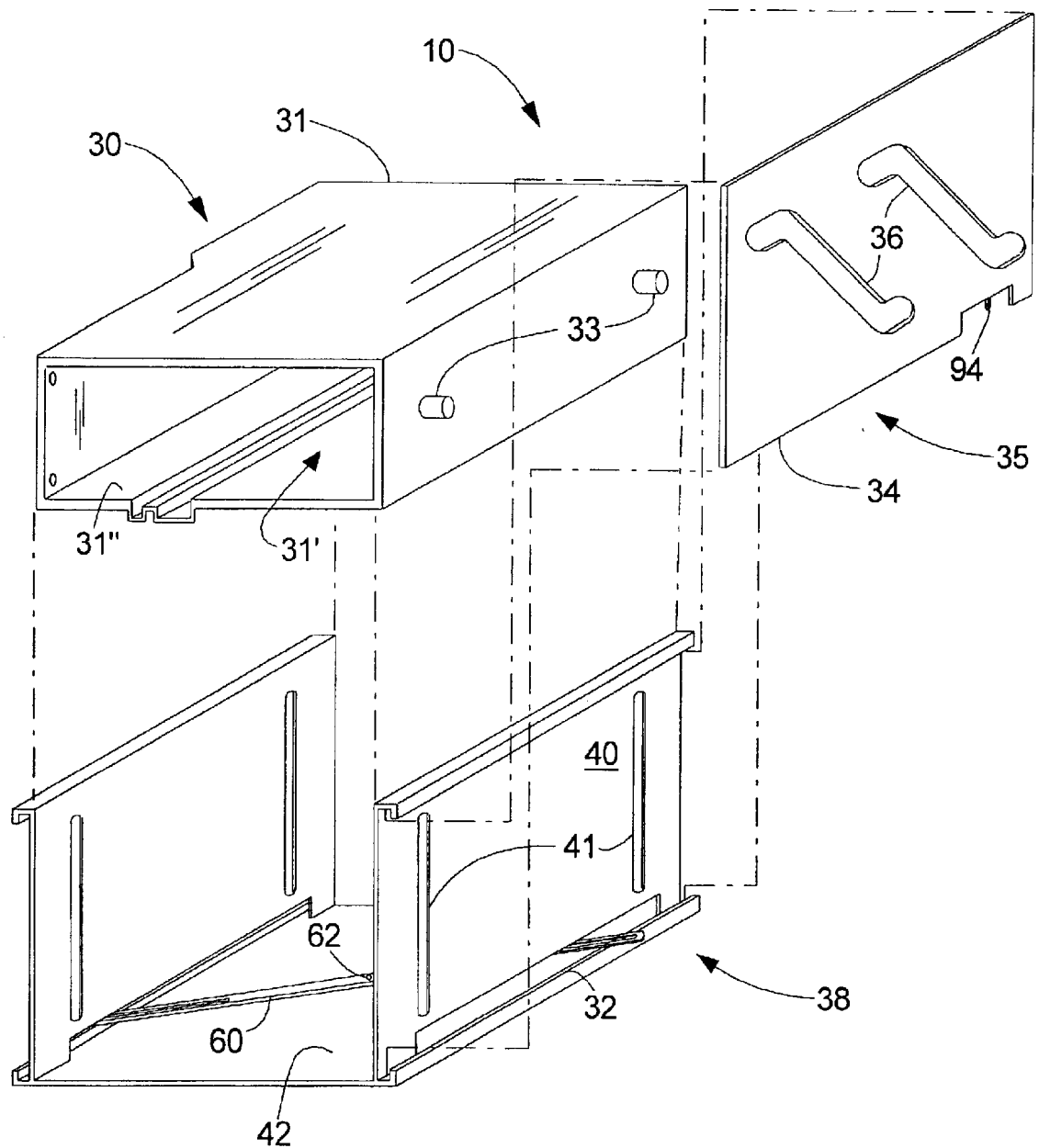
FIG. 4 is a spatial, perspective view illustrating assembly of the cartridge-handling apparatus shown in FIG. 3.

Carriage 38 is shown in more detail according to one embodiment in FIG. 4 and may comprise panels 40, 42 defining a generally U-shaped channel therebetween. In addition, a number of vertical elongate guide slots 41 formed in side panels 40 may be provided to mount the cartridge-engaging assembly 30 therein, as discussed in more detail below.

Cartridge-handling apparatus 10 may also comprise a cartridge-engaging assembly 30 mounted to carriage 38. The cartridge-engaging assembly 30 is shown in more detail in FIG. 4 according to one embodiment of the invention, and may comprise a frame assembly 31 that defines a chamber or cavity 31' sized to receive data cartridge 18. According to one embodiment, pins 33 may be provided on frame assembly 31 of the cartridge-engaging assembly and may slidably engage guide slots 41 formed in side panel 40 of carriage 38. Accordingly, cartridge-engaging assembly 30 may be slidably mounted in carriage 38.

Cartridge-engaging assembly 30 is adapted to engage a data cartridge 18, withdraw data cartridge 18 (e.g., from storage magazine 14) into chamber 31' of the cartridge-engaging assembly 30 for transport within the media storage system 12, and to eject data cartridge 18 at the intended destination (e.g., into the read/write device 16). However, since a more detailed description of the cartridge-engaging assembly 30 is not required to understand or practice the invention, the particular cartridge-engaging assembly 30 that cartridge-handling apparatus 10 may be used in conjunction with will not be described in further detail herein.

In addition, it should be understood that a wide range of cartridge-engaging assemblies, now known or that may be developed in the future, are contemplated as being within the scope of the invention. Consequently, the cartridge-handling apparatus 10 of the present invention should not be regarded as being limited to use with the particular cartridge-engaging assembly 30 shown and described herein.

Cartridge-handling apparatus 10 may also comprise a lift system (generally referred to as 35) operatively associated with carriage 38 for raising and lowering the cartridge-engaging assembly 30 relative to the carriage 38. According to one embodiment, lift system 35 may comprise a pin-in-track positioning system, such as that shown in FIG. 4.

The pin-in-track positioning system shown in FIG. 4 comprises guide pins 33 mounted to, or otherwise formed on cartridge-engaging assembly 30, guide slots 41 formed in carriage 38, and a movable lift plate 34 having inclined positioning tracks 36 formed therein. Lift-plate 34 is mounted to carriage 38 to slide in rails 32. Another lift-plate and guide pins are also provided on the opposite side of cartridge-engaging assembly 30, and although not shown in FIG. 4, the other lift-plate and guide pins are identical to lift-plate 34 and guide pins 33 shown in FIG. 4. The other lift-plate is, in this embodiment, mounted to carriage 38 in an orientation opposite to that of lift plate 34 so that the inclined positioning tracks formed therein are inclined in the opposite direction to those shown on lift plate 34 in FIG. 4, as will become apparent when the operation of the lift system 35 is described in more detail below (see FIG. 5).

The pin-in-track positioning system may be assembled such that guide pins 33 on cartridge-engaging assembly 30 slidably engage guide slots 41 formed in carriage 38 and the inclined positioning tracks 36 formed in lift-plate 34. The carriage 38 also comprises guide rails 32 mounted to or formed thereon, in which lift plate 34 may be slidably fitted within.

Also according to this embodiment of lift system 35, an actuator assembly is provided for moving lift plates 34 in rails 32. According to one embodiment, the actuator assembly may comprise a drive motor 90 (FIG. 3) mounted to carriage 38 and having a shaft 62 operatively associated therewith. Drive motor 90 is operable to rotate a crank assembly 60. Crank assembly 60 engages lift plates 34 at pin 94 and as it rotates, the cooperative action of pin 94 and crank assembly 60 causes lift plates 34 to move relative to the sides 40 of carriage 38. As lift plate 34 moves, the cooperative action of guide slots 41 and the inclined positioning tracks 36 causes guide pins 33 to "climb" or "descend", as the case may be, thus raising or lowering the cartridge-engaging assembly 30 relative to carriage 38. Operation of lift system 35 will be discussed in more detail below.

Guide pins 33 and tracks 36, 41 are preferably sized to engage one another, while providing a balance between a low-friction sliding fit and good positioning accuracy. Although cartridge-handling apparatus 10 is shown and described herein having a four-pin pin-in-track vertical positioning system (i.e., two guide pins 33 formed in each side of the carriage 38), other embodiments may make use of fewer or more guide pins 33 and corresponding tracks 36, 41. It is noted that the size and number of the guide pins 33 and tracks 36, 41 may vary based on design considerations. Such design considerations may include, but are not limited to, the size and/or weight of the cartridge-engaging assembly 30. In addition, although not required, the tracks 36, 41 are preferably coated with a low-friction material (e.g., Teflon®) to provide a low-friction bearing surface for the guide pins 33. In addition, the guide pins 33 may be manufactured from steel, although other materials may also be used.

It is also noted that cartridge-handling apparatus 10 is not limited to use with lift system 35 shown and described herein. For example, one or more of the guide pins 33 may be driven to move lift plate 34. In such an embodiment, guide pin(s) 33 may rotate and engage (e.g., by gears or frictionally) the inclined positioning tracks 36 to climb or descend with respect thereto. Also for example, the pin-in-track vertical positioning system may comprise a variety of different track patterns. Another suitable pin-in-track lift system that may be used according to the teachings of the present invention is described in more detail in co-owned U.S. Pat. No. 5,996,741 (Dec. 7, 1999) for the PIN-IN-TRACK LIFT SYSTEM of Jones, et al., hereby incorporated by reference for all that it discloses. In addition, cartridge-handling apparatus 10 is not limited to use with a pin-in-track vertical positioning system. In other embodiments, cartridge-handling apparatus 10 may be provided with other lift systems, such as but not limited to, a belt-driven lift system, a screw-driven lift system, a gear-and-rack lift system, etc. Other lift systems are well-understood and can be readily adapted for use with the present invention by one skilled in the art after having become familiar with the teachings of the invention.

Before describing operation of the cartridge-handling apparatus 10, it should be noted that the components of cartridge-handling apparatus 10 may be fabricated from any of a wide range of materials suitable for the intended application. By way of example, platform 64, carriage 38, and lift plates 34 may be fabricated from sheet metal, and frame assembly 31 of the cartridge-engaging assembly 30 may be fabricated from plastic. However, the present invention should not be regarded as limited to being fabricated from any particular material(s).

It should also be noted that cartridge-handling apparatus 10 may also house various ancillary devices, such as power supplies, electronic controls, and data processing systems. Such ancillary devices are commonly associated with media storage systems, and therefore are not shown or described herein as they are well-understood and further description is not needed for a full understanding of, or to practice the invention.

Although embodiments of cartridge-handling apparatus 10 have been shown and described herein according to particular embodiments, and as it may be used with embodiments of particular media storage systems 12, other embodiments of the invention are also contemplated as being within the scope of the invention.

Cartridge-handling apparatus 10 may be operated as follows, according to one embodiment of the invention to access and transport data cartridges 18 in the media storage system 12. Briefly, when a user makes a request to access a particular data cartridge 18, a signal is delivered to the control system (not shown) for cartridge-handling apparatus 10. The control system positions cartridge-handling apparatus 10 in the media storage system 12 adjacent storage magazine 14 where the data cartridge 18 is stored. Once retrieved from storage magazine 14, the control system positions cartridge-handling apparatus 10 in the media storage system 12 adjacent read/write device 16. Data cartridge 18 is then ejected into read/write device 16 for access to data stored thereon.

More specifically, where cartridge-handling apparatus 10 is moved to another location in the media storage system 12 (e.g., along the displacement path defined by the guide system 20) the drive system 70 is actuated. Drive motor 70 rotates gear assembly 72 operatively associated therewith, which engages gear rack 68 on guide track 66. Depending on the rotation of the drive motor 70 (e.g., clockwise or counter-clockwise), cartridge-handling apparatus 10 is moved either in the direction of arrow 22 or in the direction of arrow 23 within the media storage system 12. Once cartridge-handling apparatus 10 has been positioned at the desired location along guide system 20, drive motor 70 is shut off or otherwise disengaged.

Where cartridge-handling apparatus 10 is to be rotated about axis 11 in the media storage system 12, drive system 82 is actuated to rotate carriage 30 with respect to the platform 64. That is, drive motor 82 is operated to rotate gear assembly 84, which engages gear ring 80. In turn, carriage 30, and cartridge-engaging assembly 30 mounted therein, are rotated with respect to platform 64 about axis 11. Depending on the rotation of drive motor 70 (e.g., clockwise or counter-clockwise) carriage 30 is rotated in one direction or the other (i.e., as illustrated by arrows 24). Accordingly, the cartridge-handling apparatus 10 may be rotated so that cartridge-engaging assembly 30 faces either of the opposing storage magazines 14, 14', or read/write device 16, as the case may be. Once the cartridge-handling apparatus 10 has been oriented in the media storage system 12 to face in the desired direction, drive motor 82 is disengaged or shut off.

The cartridge-engaging assembly 30 may also be vertically positioned. For example, the cartridge-engaging assembly 30 may be raised to retrieve the desired data cartridge 18 from an upper storage chamber 28 in one of the storage magazines 14, 14'. Or for example, the cartridge-engaging assembly 30 may be lowered to retrieve the desired data cartridge 18 from a lower storage chamber 28 in one of the storage magazines 14, 14'.

Vertical movement of cartridge-engaging assembly 30 is the result of the cooperative action of the moving plates 34 relative to carriage 38. Although the following description is primarily directed to one side of the cartridge-handling apparatus 10, identical events and functions may also occur simultaneously with respect to the other side of the cartridge-handling apparatus 10.

Figure 5:
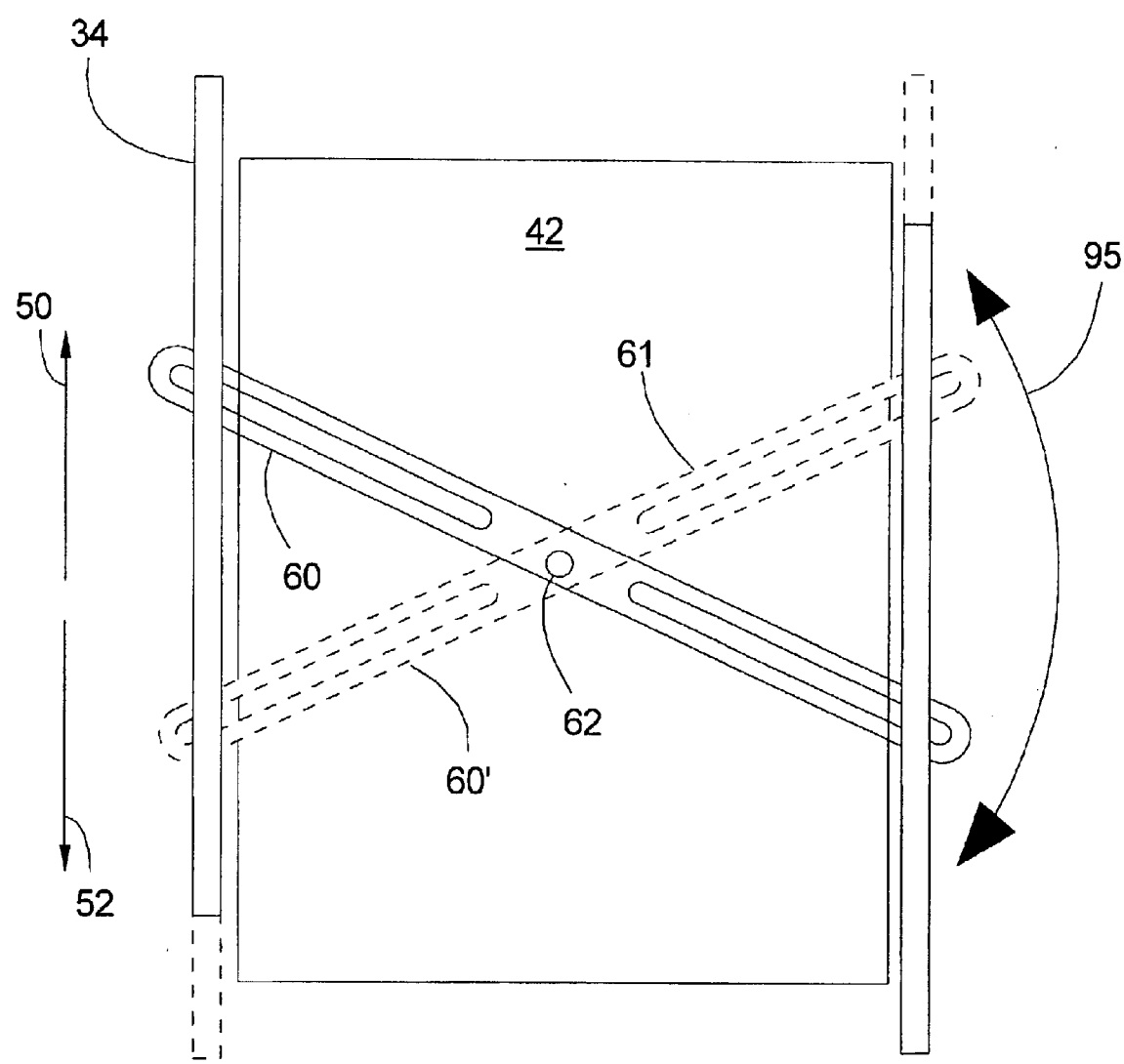
FIG. 5 is a plan view of the cartridge-handling apparatus of FIG. 3 illustrating operation of one embodiment of a lift system therefor.

An embodiment for moving plates 34 is illustrated in FIG. 5. According to this embodiment, drive motor 90 (FIG. 3) is operated to rotate crank assembly 60 about pivot 62 (e.g., in the direction of arrows 95 of FIG. 5). As crank assembly 60 is moved, pins 94 that engage plates 34 cause lift-plates 34 to move in the directions of arrows 50 and 52. That is, as crank assembly moves into the position shown as a solid line 60 in FIG. 5, it causes one plate 34 to move in the direction of arrow 50 and the other plate to simultaneously move in the direction of arrow 52. Likewise, when the crank assembly moves into the position shown as a dashed line 60' in FIG. 5, it causes one plate 34 to move in the direction of arrow 52 and the other plate to simultaneously move in the direction of arrow 50.

Figure 6A:
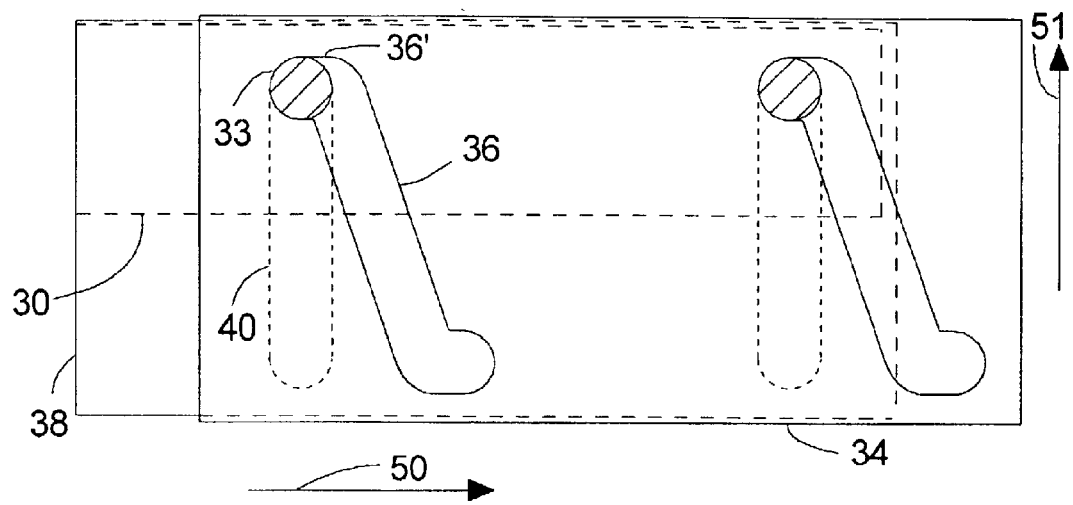
FIG. 6(a) is a simplified side view of the cartridge-handling apparatus shown in FIG. 3, illustrating the cartridge-engaging assembly thereof in a raised position.

As one of the lift plate 34 moves in the direction of arrow 50, guide pins 33 (and hence cartridge-engaging assembly 30) are caused to move upwardly relative to carriage 38, as illustrated in FIG. 6(a) by arrow 51, due to the cooperative action of the inclined positioning tracks 36 and guide tracks 41. When guide pins 33 reach the upper dwell region 36' of the inclined positioning tracks 36, drive system 90 may stop the motion of lift plate 34. Accordingly, the cartridge-access device 30 is vertically positioned in a raised position relative to the carriage 38, as shown in FIG. 6(a).

Figure 6B:
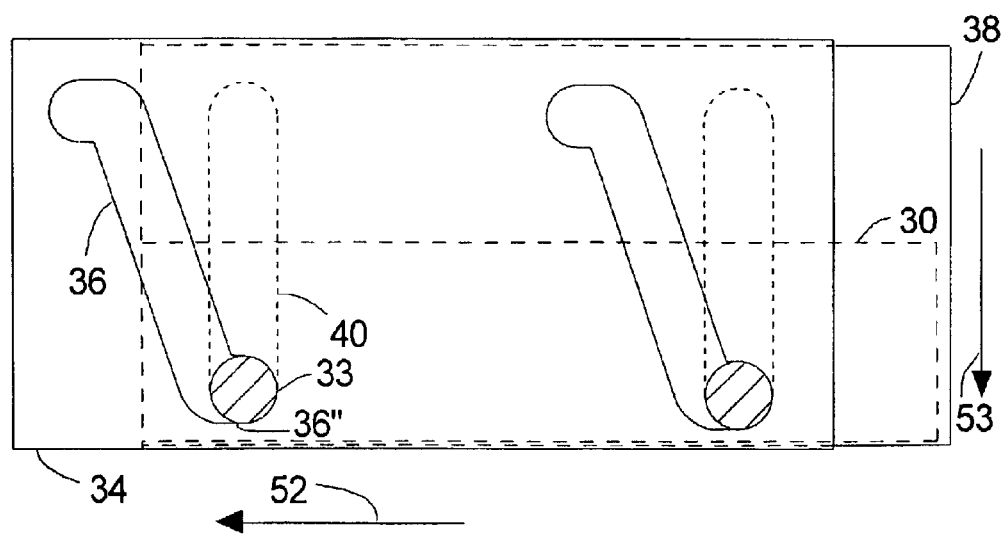
FIG. 6(b) is a simplified side view of the cartridge-handling apparatus shown in FIG. 3, illustrating the cartridge-engaging assembly thereof in a lowered position.

If it is desired to lower the cartridge access device 30, the drive system causes lift plate 34 to move in the opposite direction relative to carriage 38 (e.g., in the direction of arrow 52), as illustrated in FIG. 6(b). As lift plate 34 moves in the direction of arrow 52, guide pins 33 are caused to move downward (i.e., in the direction of arrow 53) relative to carriage 38 due to the cooperative action of the inclined positioning tracks 36 and guide tracks 41. When guide pins 33 reach the lower dwell region 36" of the inclined positioning tracks 36, drive system 90 may stop the motion of lift plate 34. Accordingly, the cartridge-access device 30 is vertically positioned in a lowered position relative to carriage 38.

Accordingly, the cartridge-engaging assembly 30 of cartridge-handling apparatus 10 may be vertically positioned relative to carriage 38 to access data cartridges 18 stored in more than one plane of the media storage system 12. Once the data cartridge 18 has been retrieved, cartridge-handling apparatus 10 may be repositioned in the media storage system 12 to deliver data cartridge 18 (e.g., to the read/write device 16). Although operation of the cartridge-handling apparatus 10 has been described herein to retrieve a data cartridge 18 from storage magazines 14, 14', it is understood that the cartridge-handling apparatus 10 may similarly be operated to retrieve and deliver data cartridge 18 to and from read/write device 16 and a mail slot (not shown). Likewise, it is understood that operation of cartridge-handling apparatus 10 is not limited to any particular order. For example, cartridge-engaging assembly 30 may be vertically positioned and/or simultaneously rotated as it is translated laterally along displacement path 22, 23 in the media storage system.

Having described embodiments of the invention, it is readily apparent that the media storage system 12 and the cartridge-handling apparatus 10 for use therewith represent important developments in data storage technology in general and to media storage systems and cartridge-handling apparatus in particular. The cartridge-handling apparatus 10 of the present invention can quickly and readily access the data cartridges stored in the media storage system 12, thereby increasing the storage density of the media storage system 12. Also advantageously, the storage magazine(s) 14, 14' of the present invention may be designed for use with standard electronic industry association (EIA) rack systems.

What is claimed is:

1. A cartridge-handling apparatus for a media storage system, comprising:

a platform mounted in said media storage system and movable along a displacement path defined therein;

a carriage mounted to said platform and rotatable about an axis, said axis being normal to said displacement path;

a cartridge-engaging assembly mounted to said carriage, said cartridge-engaging assembly facing different directions when said carriage is rotated about said axis; and a lift system operatively associated with said cartridge-engaging assembly for vertically positioning said cartridge-engaging assembly relative to said carriage.

2. The cartridge-handling apparatus of claim 1, wherein said lift system comprises:

a lift plate having at least one positioning track formed therein;

at least one guide slot formed in said carriage;

at least one pin mounted to said cartridge-engaging assembly and engaging said at least one positioning track and said at least one guide slot, wherein the cooperative action of said at least one pin sliding in said at least one positioning track and said at least one guide slot when said lift plate is moved relative to said carriage raises and lowers said cartridge-engaging assembly as desired.

3. The cartridge-handling apparatus of claim 2, wherein said lift system comprises a crank assembly for moving the lift plate relative to said carriage.

4. The cartridge-handling apparatus of claim 1, wherein said platform is mounted to a guide system.

5. The cartridge-handling apparatus of claim 1, further comprising:
a gear ring mounted to said carriage; and
a gear assembly engaging said gear ring to rotate said carriage with respect to said platform.

6. The cartridge-handling apparatus of claim 1, further comprising at least one load-bearing member mounted between said platform and said media storage system.

7. The cartridge-handling apparatus of claim 1, further comprising at least one load-bearing member mounted between said carriage and said platform.

8. A cartridge-handling apparatus for a media storage system, comprising:
a platform moveably mounted to said media storage system so that said platform is moveable along a displacement path along opposing storage magazines in said media storage system;
a carriage rotatably mounted to said platform so that said carriage is rotatable with respect to said platform about an axis normal to the displacement path;
means for engaging a data cartridge moveably mounted to said carriage so that said means for engaging a data cartridge may be raised and lowered with respect to said carriage;
means for moving said platform along said displacement path;
means for rotating said carriage about said axis;
means for raising and lowering said means for engaging with respect to said carriage,
so that said means for engaging a data cartridge faces either of said opposing storage magazines in said media storage system.

9. The cartridge-handling apparatus of claim 8, wherein said means for moving is operatively associated with at least one guide means in said media storage system.

10. The cartridge-handling apparatus of claim 8, wherein said means for rotating rotates said carriage relative to at least one guide means.

11. A media storage system, comprising:
first and second storage magazines arranged facing substantially opposite one another and having at least upper and lower storage chambers formed therein;
a guide system defining a displacement path between said first and second storage magazines;
a platform mounted to said guide system so that said platform is moveable along the displacement path;
a carriage rotatably mounted to said platform so that said carriage is rotatable about an axis normal to said displacement oath;
a cartridge-engaging assembly mounted to said carriage so that said cartridge-engaging assembly is movable along said displacement path between said first and second storage magazines, and rotatable about said axis so that said cartridge-engaging assembly is rotatable to face either said first or said second storage magazine; and
a lift system operatively associated with said cartridge-engaging assembly to raise and lower said cartridge-engaging assembly with respect to said carriage to allow said cartridge-engaging assembly to be positioned adjacent said upper and lower storage chambers formed in said first and second storage magazines.

12. The media storage system of claim 11, further comprising a read/write device arranged adjacent said first and second storage magazines.

13. The media storage system of claim 12, wherein said read/write device is a dual-capacity read/write device.

14. The media storage system of claim 12, wherein said carriage is rotatable to face said read/write device.

15. The media storage system of claim 11, wherein said first and second storage magazines are sized to fit within an EIA standard-sized media storage system.

16. The media storage system of claim 11, wherein said first and second storage magazines are sized to fit within a "2U" media storage system.

17. The media storage system of claim 11, wherein said first and second storage magazines are sized to fit within a "3U" media storage system.

18. The media storage system of claim 11, wherein said first and second storage magazines each have a capacity to store at least six data cartridges therein.

19. The media storage system of claim 11, wherein said first and second storage magazines are configured to receive at least one horizontally-oriented data cartridge.

20. The media storage system of claim 11, wherein said first and second storage magazines are configured to receive at least two horizontally-oriented data cartridges.

* * * * *

UNITED STATES PATENT AND TRADEMARK OFFICE
CERTIFICATE OF CORRECTION

PATENT NO. : 6,851,910 B2  Page 1 of 1
APPLICATION NO. : 10/202731
DATED : February 8, 2005
INVENTOR(S) : Robert Wesley Luffel It is certified that error appears in the above-identified patent and that said Letters Patent is hereby corrected as shown below:

In column 11, line 44, in Claim 8, after "carriage" delete ",".

In column 12, line 12, in Claim 11, after "displacement" delete "oath" and insert -- path --, therefor.

In column 12, line 17, in Claim 11, after "magazines" delete ",".

Signed and Sealed this

Eleventh Day of August, 2009

David J. Kappos
*Director of the United States Patent and Trademark Office*